United States Patent
Caveney et al.

(10) Patent No.: US 9,838,761 B2
(45) Date of Patent: *Dec. 5, 2017

(54) INTELLIGENT PATCHING SYSTEM

(71) Applicant: Panduit Corp., Tinley Park, IL (US)

(72) Inventors: Jack E. Caveney, North Palm Beach, FL (US); Ronald A. Nordin, Naperville, IL (US); Shahriar B. Allen, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,229

(22) Filed: Aug. 12, 2016

(65) Prior Publication Data

US 2016/0373839 A1  Dec. 22, 2016

Related U.S. Application Data

(63) Continuation of application No. 14/797,635, filed on Jul. 13, 2015, now Pat. No. 9,426,032, which is a
(Continued)

(51) Int. Cl.
*H01R 13/641* (2006.01)
*H04L 5/20* (2006.01)
(Continued)

(52) U.S. Cl.
CPC .............. *H04Q 1/136* (2013.01); *H01R 3/00* (2013.01); *H01R 13/6581* (2013.01); *H01R 24/20* (2013.01); *H01R 24/28* (2013.01);
*H01R 24/64* (2013.01); *H01R 24/76* (2013.01); *H04L 41/085* (2013.01); *H04L 49/15* (2013.01)

(58) Field of Classification Search
CPC .... H01R 13/641; H01R 3/00; H01R 13/6581; H01R 24/20; H01R 13/465; H01R 13/6272; H01R 13/7175; H01R 13/717; H01R 29/00; H04L 5/20; H04L 12/24; H04L 12/933; H04L 41/085; H04L 49/15; H04Q 1/02; H04Q 1/136; H04M 7/08
USPC ........... 439/488–490, 404, 515, 49; 340/815, 340/12.32, 657, 568.2, 45; 702/127;
(Continued)

(56) References Cited

U.S. PATENT DOCUMENTS 6,285,293 B1  9/2001  German et al.
7,455,527 B2  11/2008  Nordin et al.
(Continued)

FOREIGN PATENT DOCUMENTS

CN  101030888 A  9/2007
GB  2347508 A  9/2000
(Continued)

*Primary Examiner* — Gary Paumen
(74) *Attorney, Agent, or Firm* — Christopher S. Clancy; James H. Williams; Christopher K. Marlow

(57) ABSTRACT

An intelligent network patch field management system is provided that includes active electronic hardware, firmware, mechanical assemblies, cables, and software that guide, monitor, and report on the process of connecting and disconnecting patch cords plugs in an interconnect or cross-connect patching environment. The system is also capable of monitoring patch cord connections to detect insertions or removals of patch cords or plugs. In addition, the system can map embodiments of patch fields.

4 Claims, 26 Drawing Sheets

Related U.S. Application Data continuation of application No. 14/081,443, filed on Nov. 15, 2013, now Pat. No. 9,083,088, which is a continuation of application No. 12/616,424, filed on Nov. 11, 2009, now Pat. No. 8,588,050.

(60) Provisional application No. 61/113,868, filed on Nov. 12, 2008.

(51) Int. Cl.

| | | |
|---|---|---|
| *H01R 3/00* | (2006.01) | |
| *H04L 12/24* | (2006.01) | |
| *H01R 13/6581* | (2011.01) | |
| *H04L 12/933* | (2013.01) | |
| *H01R 24/20* | (2011.01) | |
| *H04Q 1/02* | (2006.01) | |
| *H01R 24/64* | (2011.01) | |
| *H01R 24/28* | (2011.01) | |
| *H01R 24/76* | (2011.01) | |

(58) Field of Classification Search
USPC ........... 324/66, 133, 508; 327/518; 362/253; 370/200
See application file for complete search history.

(56) References Cited

U.S. PATENT DOCUMENTS

| | | |
|---|---|---|
| 7,488,206 B2 | 2/2009 | Caveney et al. |
| 7,553,161 B2 | 6/2009 | Nordin et al. |
| 7,563,102 B2 | 7/2009 | Nordin et al. |
| 7,573,254 B2 | 8/2009 | Cobb et al. |
| 7,771,203 B2 | 8/2010 | Nordin et al. |
| 7,811,119 B2 | 10/2010 | Caveney et al. |
| 7,938,700 B2 | 5/2011 | Jacks et al. |
| 7,999,143 B2 | 8/2011 | Marker et al. |
| 8,014,518 B2 | 9/2011 | King et al. |
| 8,128,428 B2 | 3/2012 | Caveney et al. |
| 8,197,280 B2 | 6/2012 | Caveney et al. |
| 8,246,397 B2 | 8/2012 | Jacks et al. |
| 8,267,706 B2 * | 9/2012 | Patel .................. H01R 13/516 439/188 |
| 8,419,465 B2 | 4/2013 | Jacks et al. |
| 8,588,050 B2 | 11/2013 | Caveney et al. |
| 8,638,651 B2 | 1/2014 | Michaelis et al. |
| 8,686,870 B2 | 4/2014 | Caveney et al. |
| 8,715,001 B2 * | 5/2014 | Jacks .................. H01R 13/641 439/540.1 |

FOREIGN PATENT DOCUMENTS

| | | |
|---|---|---|
| JP | 2009211838 | 9/2009 |
| WO | 2006052686 A1 | 5/2006 |
| WO | 2007025223 A1 | 3/2007 |
| WO | 2007106528 A2 | 9/2007 |

\* cited by examiner

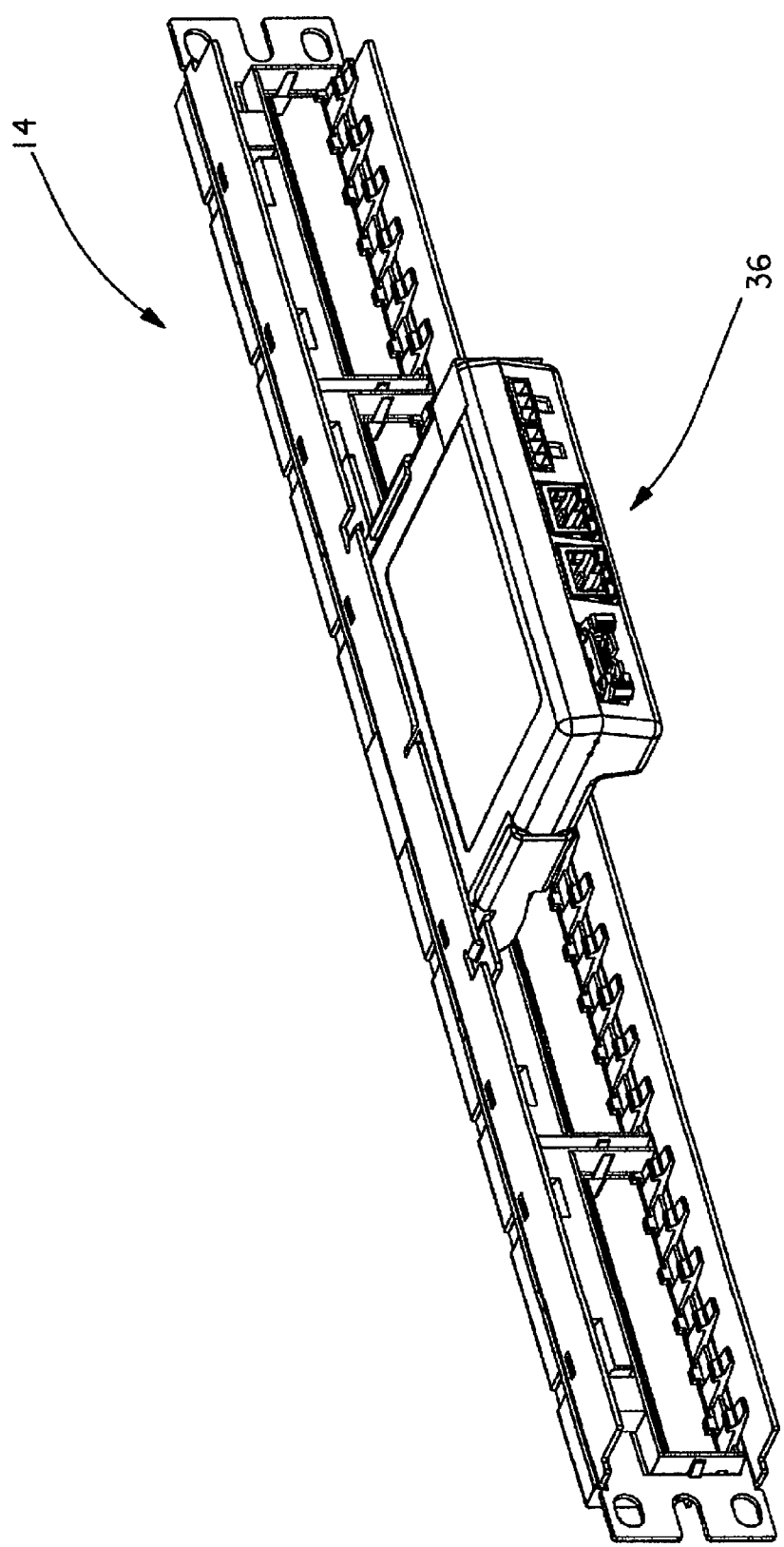

Interconnect:

| Correct installation of a patch cord: | |
|---|---|
| • LED on provisioning port flashes Green | PViQ Patch Panel —FG— Switch |
| Panel plug is plugged into provisioning port:<br>• LED on provisioning port turns solid Green for a short time period<br>• Switch plug LED (on PDA screen) flashes Green | PViQ Patch Panel —G— —FG— Switch |
| Switch plug is plugged into correct switch port:<br>• Switch plug LED (on PDA screen) turns solid Green for a short period of time<br>• LED at correct port of panel flashes Green | PViQ Patch Panel —FG— —G— Switch |
| Panel plug is removed from provisioning port and installed in correct panel port within preset short time period:<br>• LED at correct panel port turns solid Green for a short period of time | PViQ Patch Panel —G— Switch |
| Correct removal of a patch cord: | |
| • Switch plug LED flashes Red | PViQ Patch Panel —FR— Switch |
| Switch plug is removed:<br>• Switch plug LED (on PDA screen) turns solid Red for a short period of time<br>• Panel LED flashes Red | PViQ Patch Panel —FR— —R— Switch |
| Panel Plug is removed:<br>• Panel port LED turns solid Red for a short period of time | PViQ Patch Panel —R— Switch |

FIG. 12a

Cross-connect:

| Correct installation of a patch cord | |
|---|---|
| • LEDs on both correct panel ports flash Green. | 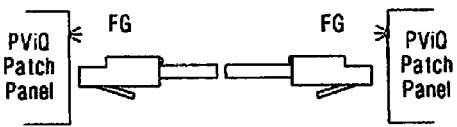 |
| One Patch Cord Plug is plugged into a correct panel port:<br>• Panel port LED turns solid Green for a short period of time.<br>• Plug LED on other end of patch cord (on PDA screen) flashes Green. | 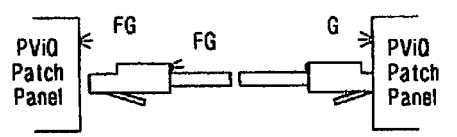 |
| Other patch cord plug is plugged into other correct panel port:<br>• Panel port LED turns solid Green for a short period of time. | 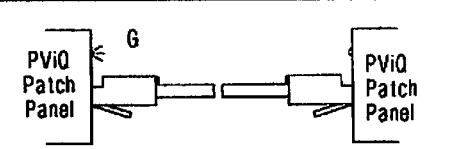 |
| Correct removal of a patch cord: | |
| • Both panel LEDs flash Red. | 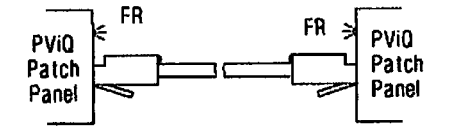 |
| One Plug is removed from a panel port:<br>• That panel port LED turns solid Red for a short period of time. | 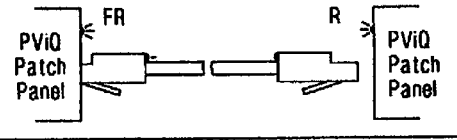 |
| Other plug is removed from other panel port:<br>• That panel port LED turns solid Red for a short period of time. | 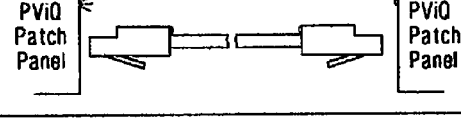 |

FIG. 12b

Interconnect:
Problem MACs

| With panel plug plugged into provisioning port, switch plug is plugged into wrong switch port: | |
|---|---|
| • Switch plug LED (on PDA screen) flashes Amber until it is removed | PViQ Patch Panel —[FA]→ Switch |
| • After removal, switch plug LED (on PDA screen) flashes Green | PViQ Patch Panel —[FG]— Switch |
| • When switch plug is installed in correct switch port, switch plug LED (on PDA screen) turns solid Green for a short period of time | PViQ Patch Panel —[G]— Switch |
| Panel plug is removed from provisioning port: | |
| • If panel plug is not plugged into the correct panel port within a short time period, the correct panel port and provisioning port flashes Amber until panel plug is plugged into provision port | PViQ Patch Panel ←[FA]— Switch |
| • If panel plug is plugged into incorrect panel port, panel port LED flashes Amber until plug is removed | PViQ Patch Panel ←[FA]— Switch |
| After correct installation, switch is removed (not authorized MAC: <br>• Switch plug (on PDA screen) flashes Amber <br>• Panel LED flashes Amber until panel plug is removed <br>• Provisioning procedure must be followed again | PViQ Patch Panel ←[FA]—[FA]→ Switch |
| After correct installation, panel plug is removed: <br>• Panel port LED and provisioning port LED flash Amber until panel plug is plugged into provisioning port. System then starts provisioning process by confirming switch plug is plugged into correct switch port. If it is, the correct panel port flashes Green | PViQ Patch Panel ←[FA]— Switch <br><br> PViQ Patch Panel ←[FG]— Switch |

FIG. 12c

Cross-connect:
Problem MACs

| First end plugged into wrong port: | |
|---|---|
| • Panel LED flashes Amber until it is removed | FA — PViQ Patch Panel ↔ PViQ Patch Panel |
| • Correct port LED then flashes Green | FG — PViQ Patch Panel ↔ PViQ Patch Panel |
| Second end plugged into wrong port: | |
| • Panel Led flashes Amber until it is removed | FA — PViQ Patch Panel ↔ PViQ Patch Panel |
| • Correct port LED then flashes Green | FG — PViQ Patch Panel ↔ PViQ Patch Panel |
| Either plug erroneously removed: | |
| • LED of port it was removed from flashes Amber and LED of that plug (on PDA screen) flashes Green | FA  FG — PViQ Patch Panel ↔ PViQ Patch Panel |

FIG. 12d

Interconnect:

| | |
|---|---|
| Correct installation of a patch cord: | |
| • LED on provisioning port flashes Green | PViQ Patch Panel — FG — Switch |
| Panel plug is plugged into provisioning port:<br>• LED on provisioning port turns solid Green for a short time period<br>• Switch plug LED flashes Green | PViQ Patch Panel — G — FG — Switch |
| Switch plug is plugged into correct switch port:<br>• Switch plug LED turns solid Green for a short period of time<br>• LED at correct port of panel flashes Green | PViQ Patch Panel — FG — G — Switch |
| Panel plug is removed from provisioning port and installed in correct panel port within preset short time period:<br>• LED at correct panel port turns solid Green for a short period of time | PViQ Patch Panel — G — Switch |
| Correct removal of a patch cord: | |
| • Switch plug LED flashes Red | PViQ Patch Panel — FR — Switch |
| Switch plug is removed:<br>• Switch plug LED turns solid Red for a short period of time<br>• Panel LED flashes Red | PViQ Patch Panel — FR — R — Switch |
| Panel Plug is removed:<br>• Panel port LED turns solid Red for a short period of time | PViQ Patch Panel — R — Switch |

FIG. 17a

Cross-connect:

| Correct installation of a patch cord | |
|---|---|
| • LEDs on both correct panel ports flash Green | PViQ Patch Panel — FG — FG — PViQ Patch Panel |
| One Patch Cord Plug is plugged into a correct panel port:<br>• Panel port LED and plug plugged into panel turns solid Green for a short period of time<br>• Plug LED on other end of patch cord flashes Green | PViQ Patch Panel — FG — FG — G — G — PViQ Patch Panel |
| Other patch cord plug is plugged into other correct panel port:<br>• Panel port LED and plug LED turns solid Green for a short period of time | PViQ Patch Panel — G — G — PViQ Patch Panel |
| Correct removal of a patch cord: | |
| • Both panel LEDs and both plug Leds flash Red | PViQ Patch Panel — FR — FR — FR — FR — PViQ Patch Panel |
| One Plug is removed from a panel port:<br>• That plug LED and that panel port LED turn solid Red for a short period of time | PViQ Patch Panel — FR — FR — R — R — PViQ Patch Panel |
| Other plug is removed from other panel port:<br>• That plug LED goes out and panel port LED turns solid Red for a short period of time | PViQ Patch Panel — R — PViQ Patch Panel |

FIG. 17b

Interconnect:
Problem MACs

| With panel plug plugged into provisioning port, switch plug is plugged into wrong switch port: | |
|---|---|
| • Switch plug LED flashes Amber until it is removed | PViQ Patch Panel — FA — Switch |
| • After removal, switch plug LED flashes Green | PViQ Patch Panel — FG — Switch |
| • When switch plug is installed in correct switch port, switch plug LED turns solid Green for a short period of time | PViQ Patch Panel — G — Switch |
| Panel plug is removed from provisioning port: | |
| • If panel plug is not plugged into the correct panel port within a short time period, the correct panel port and provisioning port flashes Amber until panel plug is plugged into provision port | PViQ Patch Panel — FA — Switch |
| • If panel plug is plugged into incorrect panel port, panel port LED flashes Amber until plug is removed | PViQ Patch Panel — FA — Switch |
| After correct installation, switch is removed (not authorized MAC):<br>• Switch plug LED flashes Amber<br>• Panel LED flashes Amber until panel plug is removed<br>• Provisioning procedure must be followed again | PViQ Patch Panel — FA — FA — Switch |
| After correct installation, panel plug is removed:<br>• Panel port LED and provisioning port LED flash Amber until panel plug is plugged into provisioning port. System then starts provisioning process by confirming switch plug is plugged into correct switch port. If it is, the correct panel port flashes Green | PViQ Patch Panel — FA — Switch<br><br>PViQ Patch Panel — FG — Switch |

FIG. 17c

Cross-connect:
Problem MACs

| First end plugged into wrong port: | |
|---|---|
| • Panel LED and plug Led flash Amber until it is removed | PViQ Patch Panel —FA— FA PViQ Patch Panel |
| • Correct port LED then flashes Green | PViQ Patch Panel —FG— PViQ Patch Panel |
| Second end plugged into wrong port: | |
| • Panel LED and plug LED flash Amber until it is removed | PViQ Patch Panel —FA— FA PViQ Patch Panel |
| • Correct port LED and plug LED then flash Green | PViQ Patch Panel —FG— FG PViQ Patch Panel |
| Either plug erroneously removed: | |
| • LED of port it was removed from flashes Amber and LED of that plug flashes Green | PViQ Patch Panel —FA— FG PViQ Patch Panel |

FIG. 17d

Safe Mode:

- Norman operating mode
- System returns to Safe Mode from other modes after timeout period.
- Indicated by solid Green SYS LED.

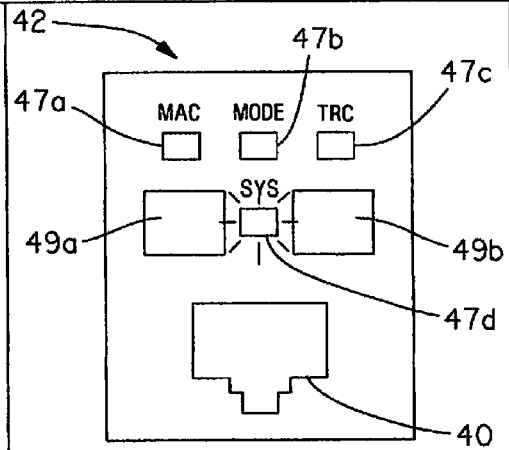

FIG. 18a

Learn Mode:

- Learn Mode is used to auto map (locate) all connection points of a cross-connect installation (e.g.,could be used after initial install of mass connections).
- Learn Mode can only be enabled via Physical Infrastructure Management (PIM) software (including access via a PDA with established permissions) and not locally via the patch panel.
- SYS LED will turn solid Amber.
- All ports which have a PViQ patch cord inserted will show solid Green and remain Green until Learn Mode is disabled (via software instruction).

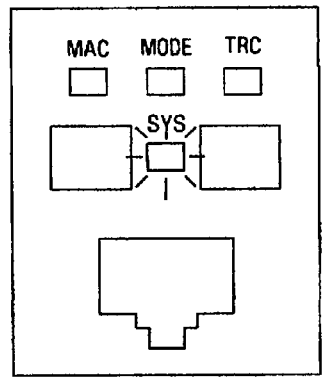

- To get out of learn mode: Learn Mode can be disabled via the PIM software only via a menu command.

FIG. 18b

Maintenance Mode:

| | |
|---|---|
| Maintenance Mode is used when scheduled work is to be done which affects the infrastructure. This mode will temporarily remove the panel from being monitored and signal all connected panels to ignore alerts generated by this panel.<br>• Press and hold both left and right buttons for about 5 seconds.<br>• The MODE LED will blink green. | 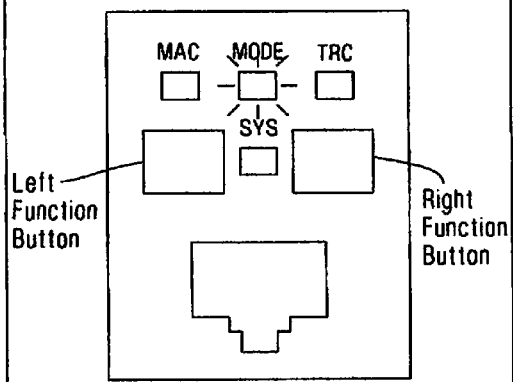 |
| • Release both buttons and then press and release the left Confirm (☑) button to enter Maintenance Mode.<br>• The MAC, TRC, and SYS LEDs will turn Green while all port LEDs will turn Red. The MODE light will extinguish. | 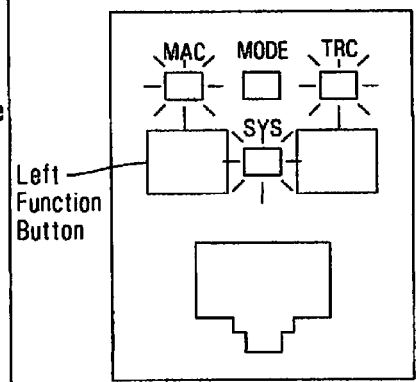 |
| • To get out of Maintenance Mode:<br>  ○ Wait for the timeout period of approximately 30 minutes and the panel will revert to Safe Mode, or<br>  ○ Press and hold both left and right buttons for about 5 seconds.<br>    • The MODE LED will blink Green.<br>    • Continue to hold both buttons until Port 1 LED blinks RED. Then press and release the left Confirm (☐) button to exit Maintenence Mode. | |

FIG. 18c

Trace Mode:

| Trace Mode is used for manual mapping of patch fields. | |
|---|---|
| Trace Mode is used for manual mapping of patch fields.<br><br>• Enter Trace mode by pressing and holding the left fundtion button of user interface on the front center of panel for 2 seconds. Upon release of the button, the "TRC" LED will flash Green and a short audible acknowledgement will be provided.<br><br>• Confirm Trace mode by momentarily pressing left function button of user interface a second time. "TRC" LED will appear solid Green and an audible acknowledgement will be provided.<br><br>• Port 1 of this panel will begin flashing alternating RED-Green. | 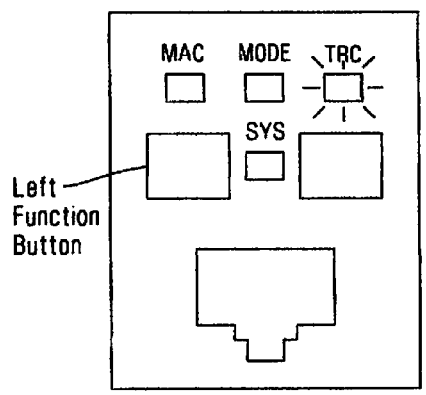<br>Left Function Button |
| • Use left and/or right function buttons to selest desired port to trace (i.e., LED at port will appear Alternating Red-Green)<br><br>• <u>Cross-Connect</u>: Port at opposite end of patch cord in selected port will also flash alternating Red-Green. In addition, the "TRC" LED on the far panel will appear solid Green when an end-to-end patch is found.<br><br>• <u>Interconnect</u>: Switch plug LED at opposite end of patch cord in selected port will also flash alternating Red-Green. Note: this function is not available with "nine-wire" systems which do not include an LED on the patch cords plugs. It is available with an enhanced 10 wire patch cord which has an LED on the switch plug. | 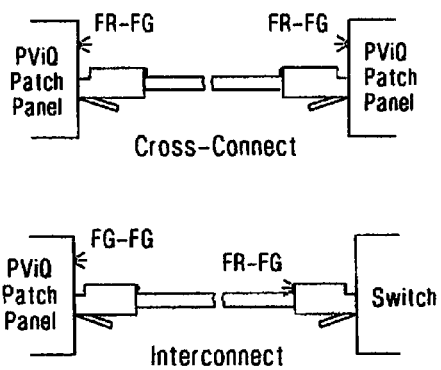 |
| • To get out of Trace Mode: Press and hold the left function button of user interface for 2 seconds.<br>Trace Mode will exit. | |

FIG. 18d

INTELLIGENT PATCHING SYSTEM

CROSS-REFERENCE TO RELATED APPLICATIONS

This application is a continuation of U.S. patent application Ser. No. 14/797,635, filed Jul. 13, 2015, which will issue as U.S. Pat. No. 9,426,032 on Aug. 23, 2016; which is a continuation of U.S. patent application Ser. No. 14/081,443, filed Nov. 15, 2013, which issued as U.S. Pat. No. 9,083,088 on Jul. 14, 2015; which is a continuation of U.S. patent application Ser. No. 12/616,424, filed Nov. 11, 2009, which issued as U.S. Pat. No. 8,588,050 on Nov. 19, 2013; which claims the benefit of U.S. Patent Application No. 61/113,868, filed Nov. 12, 2008, the subject matter of which is hereby incorporated by reference in its entirety.

TECHNICAL FIELD

The present application relates to network documentation and revision systems, and more particularly to a system for implementing an intelligent interconnect and cross-connect patching system.

BACKGROUND

Communications networks are growing in number and complexity, and are continually being interconnected to satisfy customers' needs. Patch panels are used in communications networks as intermediate elements between horizontal cabling (to which endpoint devices such as computers and telephones are connected) and network switches. Specifically, patch panels include a panel of network ports that connect incoming and outgoing lines of a local area network (LAN) or other communication system. In a LAN, for example, the patch panel connects the network's computers to switches or routers that enable the LAN to connect to the Internet or another wide area network (WAN). Connections are made with patch cords. The patch panel allows connections to be arranged and rearranged by plugging and unplugging the patch cords.

When physical connections between endpoint devices and network switches are added, moved or removed, patch panels are the points at which technicians complete the required installations or removals of patch cords within patch fields. Patch panels offer the convenience of allowing technicians to quickly change the path of selected signals.

It is important to maintain a record of changes that are made to patch cord connections within the patch field. Proper documentation of changes in the patch field assures that the routing of patch cords is always known and further assures that any future changes are completed correctly.

Human error associated with the implementation and maintenance of physical cable connections between network communication equipment can result in significant negative impact to a network. Such negative impact can be avoided through improved control and verification of network cable installation and removal work orders implemented by network technicians.

SUMMARY

In some embodiments of the present invention, systems for guiding patch cord installations and removals in a network are provided. Patch panels are provided including ports and panel management modules (PMM) having the capability to detect insertion or removal of patch cords at ports of the patch panel. PMM's are also equipped to communicate with a network management system (NMS). Systems according to the present invention may also include additional patch panels having expansion modules (EM's). The EM's are connected to the PMM and extend the functionality of the system to additional patch panels while employing simpler electronics and lowering the overall cost of the system. Panels having PMM's or EM's installed therein are termed "intelligent patch panels."

A system may be used to provide a method of guiding patch cord installations and removals in a cross-connect network by detecting insertion or removal of patch cords at ports of the patch panels. The method includes receiving a "nine-wire" patch cord into a patch panel port and determining whether a far end of the nine-wire patch cord is plugged into an intelligent patch panel. The method also includes initiating communications and exchanging data via a ninth wire of the nine-wire patch cord when both ends of the nine-wire patch cord are inserted into intelligent patch panel ports, and communicating connection status to the PMM. Further, the PMM is equipped to supply a network management system (NMS) with information regarding the connection.

The term "nine-wire" is used herein to denote an extra conductor being used beyond the eight conductors in a standard eight-conductor Ethernet patch cord. It is to be understood that this term denotes an additional conductor being used for patch cord management purposes, and thus the principles of this invention may be employed in, for example, optical systems or systems employing more or fewer than eight conductors, as long as an additional conductor in the patch cord can be used for management functions. Similarly, the term "ten-wire" is used herein to indicate patch cords and systems that have two additional conductors in patch cords that can be used for management functions. These terms are not meant to literally limit the present invention to include only patch cords having nine or ten wires within them.

The system may be used to provide for a method of guiding patch cord installations and removals in an interconnect network. This aspect of the present invention involves detecting insertion or removal of nine-wire patch cords at ports of an intelligent patch panel. Further, insertion or removal of switch-side patch cord plugs into switch ports is detected via various embodiments, including ground detection, as the ninth wire is connected to a grounding shield on a switch plug of the patch cord.

These and other aspects of the present invention are explained to those of ordinary skill in the art in the following detailed description, with reference to the drawings. It should be understood that the embodiments noted herein are not intended to limit the scope of the invention.

BRIEF DESCRIPTION OF FIGURES

FIG. 4 is a rear perspective view of an intelligent patch panel with a panel management module (PMM);

FIGS. 12a-d show printed and graphical technician instructions presented on a PDA for patch cord operations in a "nine-wire" embodiment of the present invention;

FIGS. 17a-d show printed and graphical technician instructions presented on a PDA for patch cord operations in a "ten-wire" embodiment of the present invention; and FIGS. 18a-d show user interface modes according to one embodiment of the present invention.

DETAILED DESCRIPTION

The present application provides a system with modular patch panels, panel management modules (and optional expansion modules), user interface modules, enhanced patch cords, and software that enables operations and management aspects of the system. Systems according to the present invention enable guided installation and removal of patch cords in cross-connect and interconnect environments.

Figure 1:
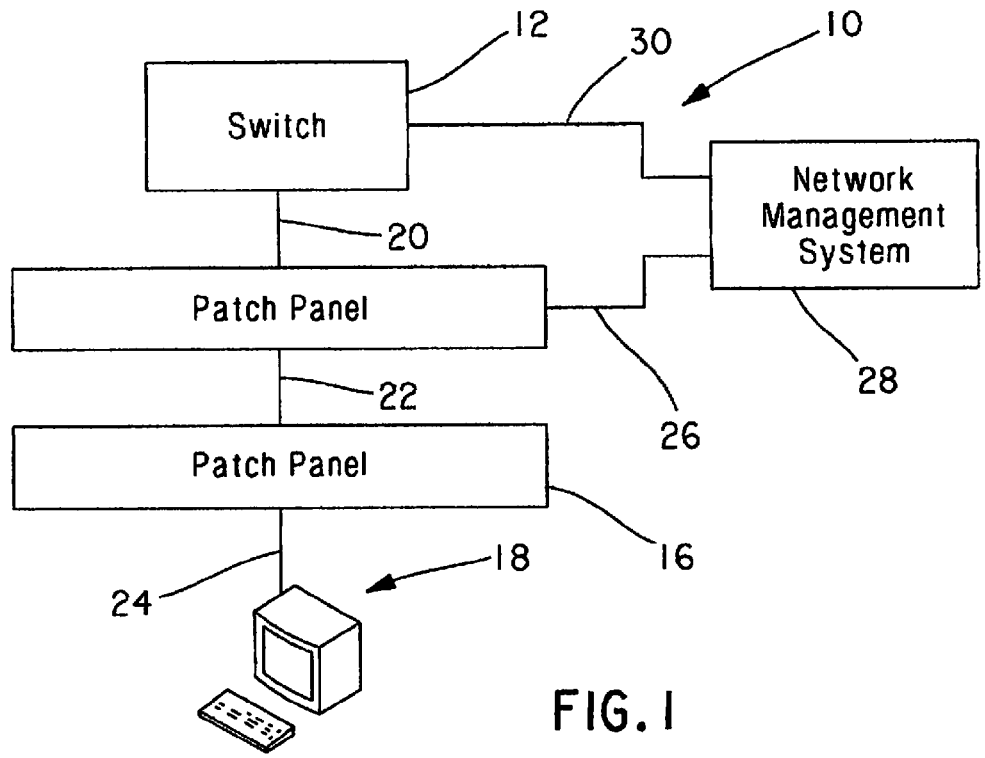
FIG. 1 is a block diagram illustrating a cross-connect network architecture.

Patch panel systems of the present application may be used within cross-connect or interconnect type architectures. FIG. 1 is a block diagram illustrating a cross-connect architecture 10, which is a configuration including a switch 12 coupled to an end computer 18 through a first patch panel 14 and a second patch panel 16. It is to be understood that the computer 18 could be replaced with any endpoint device, such as a VoIP phone or a wireless access point. In the present invention, the panels 14 and 16 are provided with "intelligence" in the form of active electronic components and circuitry, which may be provided in PMMs and wing boards for example. The switch 12 is connected to the first patch panel 14 via a standard patch cord 20. The first and second patch panels 14 and 16 are connected via nine-wire cross-connect patch cords 22 (explained in more detail below; for clarity, only one is shown in FIG. 1); and the second patch panel 16 is connected to the computer 18 via horizontal cabling 24. One of the patch panels 14 is connected via an Ethernet management connection 26 to a network management system 28, which may contain software to allow a user to view information about the connections between the first and second patch panels 14 and 16. The network management system 28 may also be connected to the switch 12 via a switch connection 30.

Figure 2:
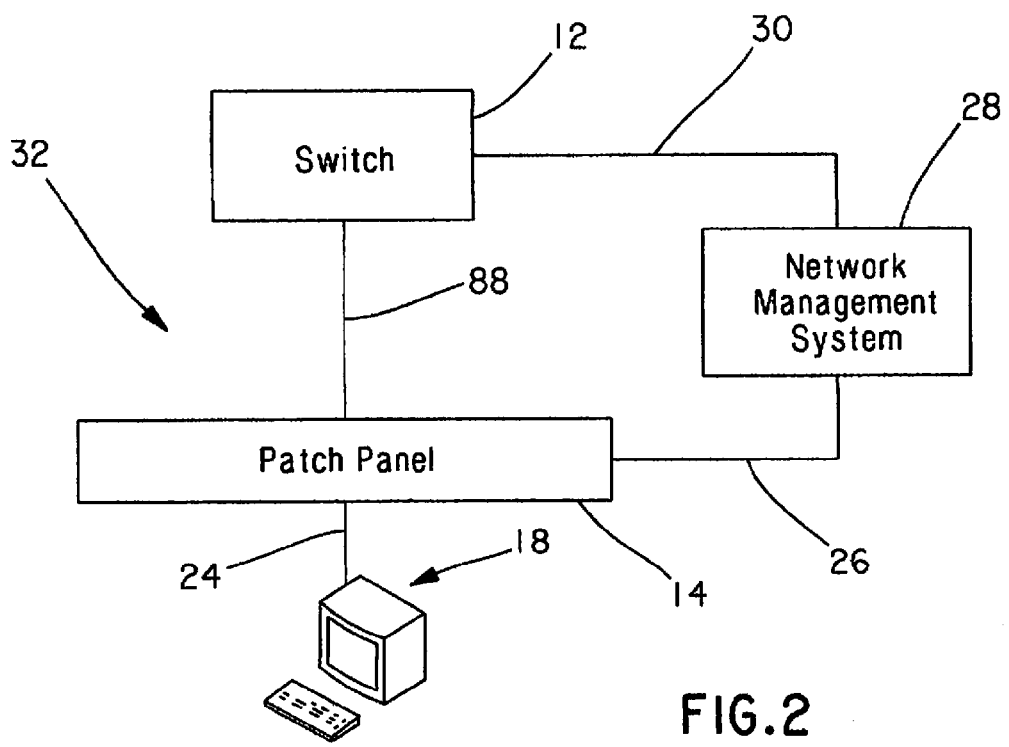
FIG. 2 is a block diagram illustrating an interconnect network architecture.

FIG. 2 is a block diagram illustrating an interconnect architecture 32, which is a configuration including a switch 12 coupled to the end computer 18 through one patch panel 14. As with the cross-connect architecture, the panel 14 in an interconnect architecture is also provided with "intelligence" in the form of circuitry, preferably contained within a PMM as described further below. In the interconnect architecture 32, the patch panel 14 is connected to the switch 12 with a nine-wire interconnect patch cord 88. As described further below, in a preferred embodiment, determination of the connection of the nine-wire interconnect patch cord 88 to a port of the switch 12 is achieved via ground detection.

Figure 3:
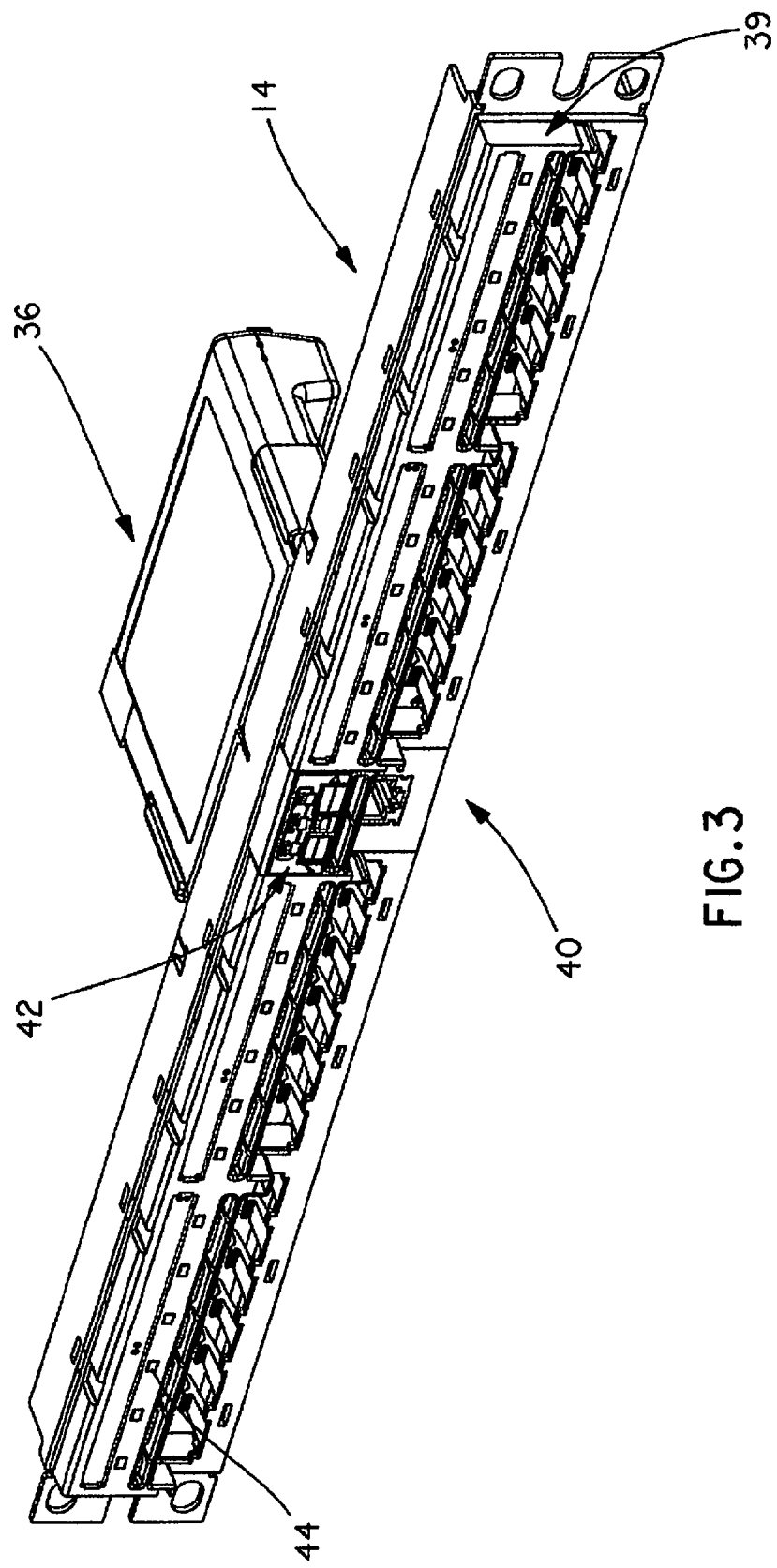
FIG. 3 is a front perspective view of an intelligent patch panel with a panel management module (PMM)

FIG. 3 is a front view of a PMM 36 installed within a patch panel 14. FIG. 4 is a rear view of a PMM 36 installed within a patch panel 14. The PMM 36 provides a processor for managed network solution products and application-specific wing boards 38 (shown in FIG. 10), which are installed along the left and right sides of the PMM and communicate with the PMM. Firmware within the PMM 36 allows the support of different types of wing boards. The wing boards, such as wing board 38, may include discrete components, program array logic (PAL) devices, PIC microcontrollers, or microprocessors, and the PMM 36 may communicate with any of these devices. Arrow 39 in FIG. 3 shows the location where a right wing board is installed.

The patch panels with PMMs include a provisioning port 40 (shown in FIG. 3). The provisioning port 40 is part of a user interface 42 in a patch panel 14 having an installed PMM 36. The provisioning port is used during the installation of interconnect patch cords. The user interface 42 has a number of LEDs used to provide information to a technician. Further, each port of the patch panel is provided with a patch panel port LED 44 to help guide a technician during the installation or removal of a patch cord. Preferably, the patch panel port LEDs 44 are tri-color LEDs (for example, red-green-amber) to enable the guiding of installation or removal of a patch cord as further described below.

Figure 4A:
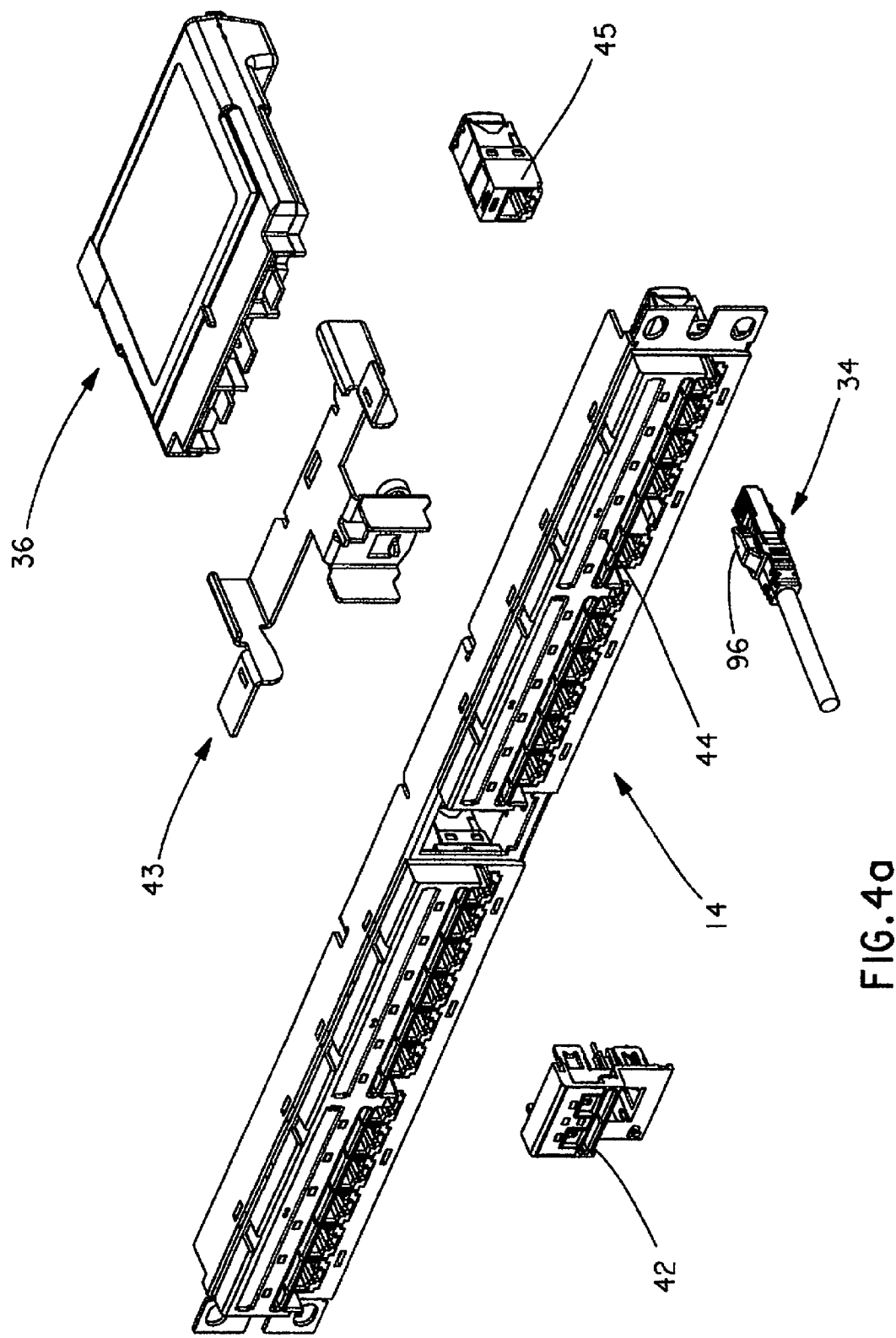
FIG. 4a is a partially exploded view of an intelligent patch panel with a PMM.
Figure 10:
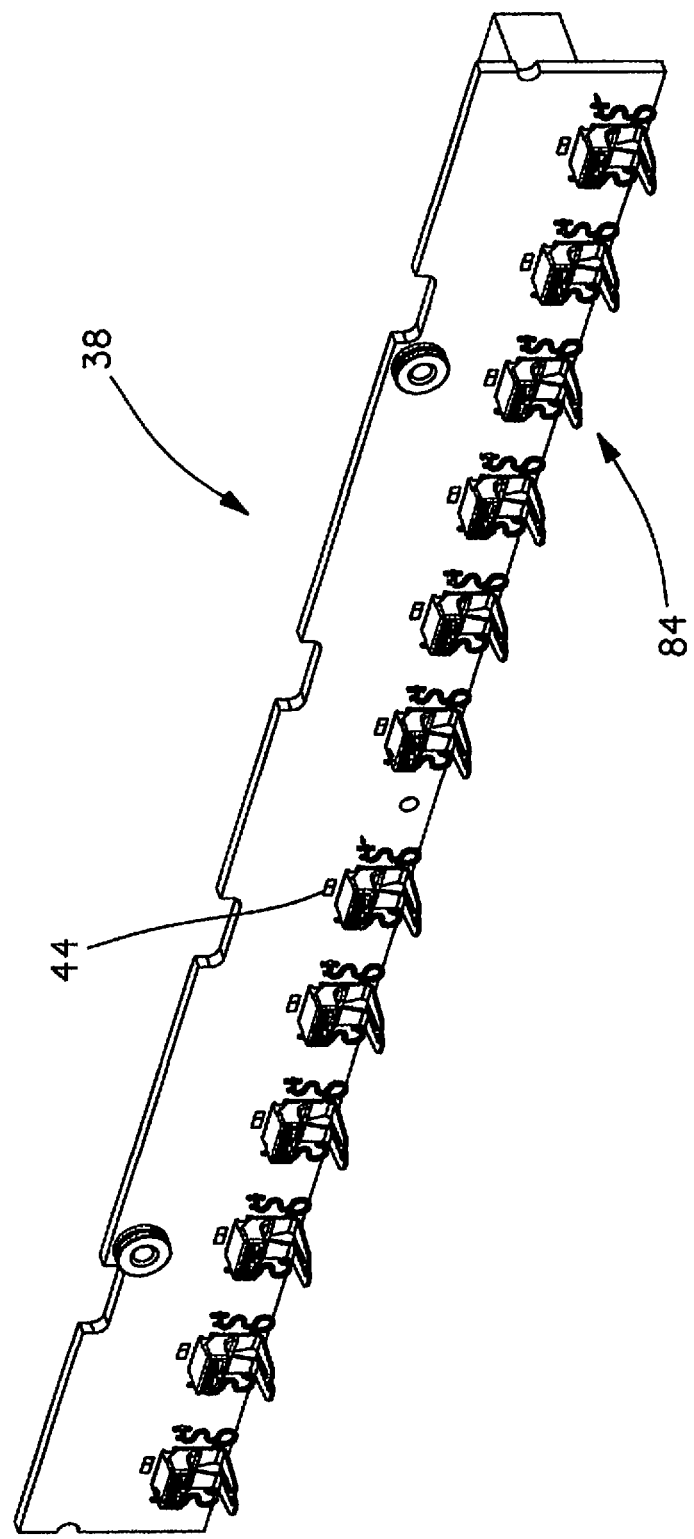
FIG. 10 is a front perspective view of a wing board according to one embodiment of the present invention.
Figure 13:
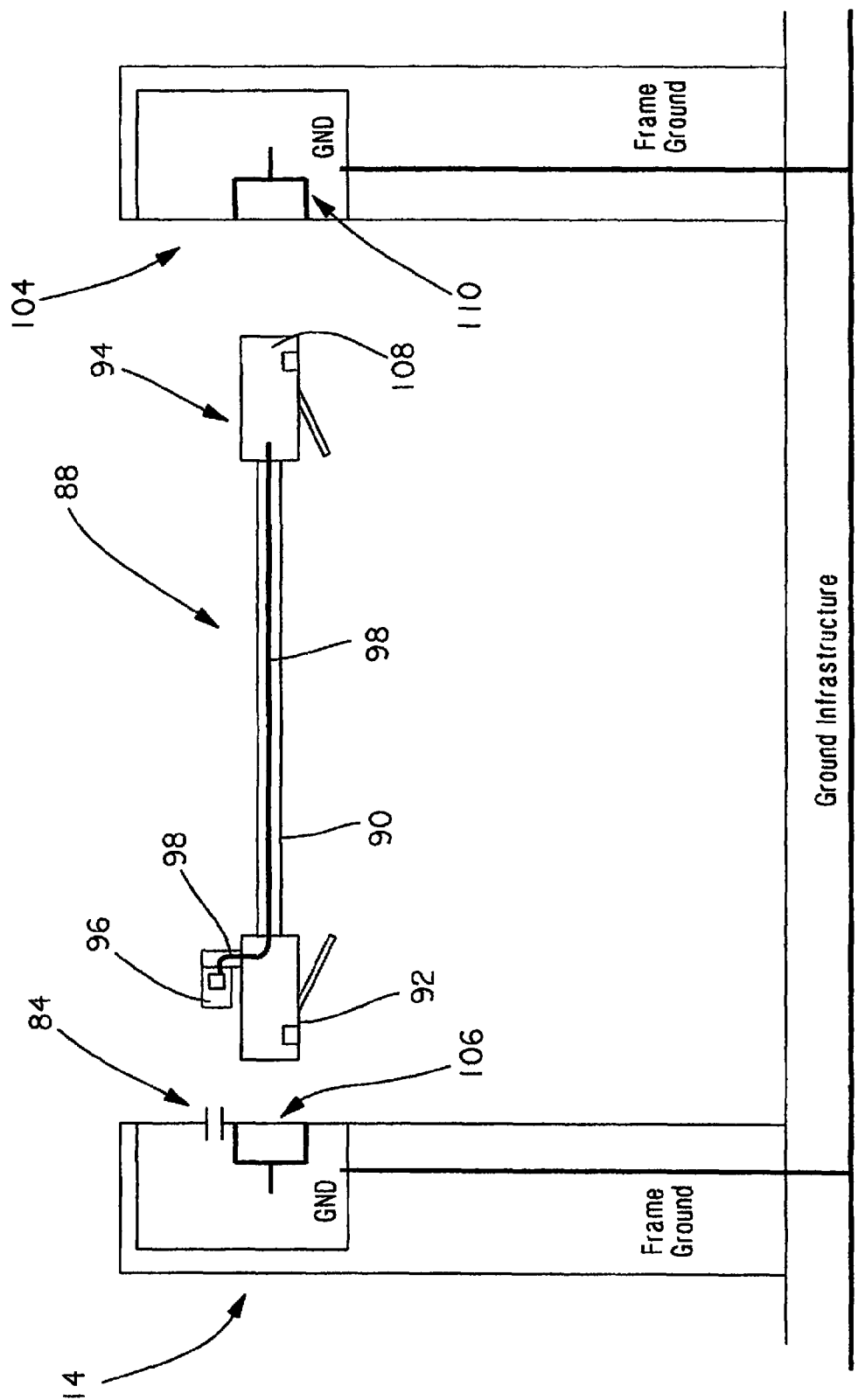
FIG. 13 is a side view illustrating the operation of an interconnect patch cord.

FIG. 4a is a partially exploded view of an intelligent patch panel 14, more clearly showing where elements of the patch panel are installed. The PMM 36 is installed at the rear of the intelligent patch panel 14 and the user interface 42 is installed in the front. Both the PMM 36 and the user interface 42 may be held in place with a mounting bracket 43. Patch panel jacks 45 may be installed from the rear, as in standard patch panels. Specialized patch cords, such as the nine-wire interconnect patch cord 34 may be inserted into the jacks 45, such that their ninth-wire contacts 96 are inserted between contact pairs 84 (as shown in FIGS. 10 and 13) associated with each patch panel port. LEDs 44 associated with each patch panel port are also seen in FIG. 4a.

Figure 4B:
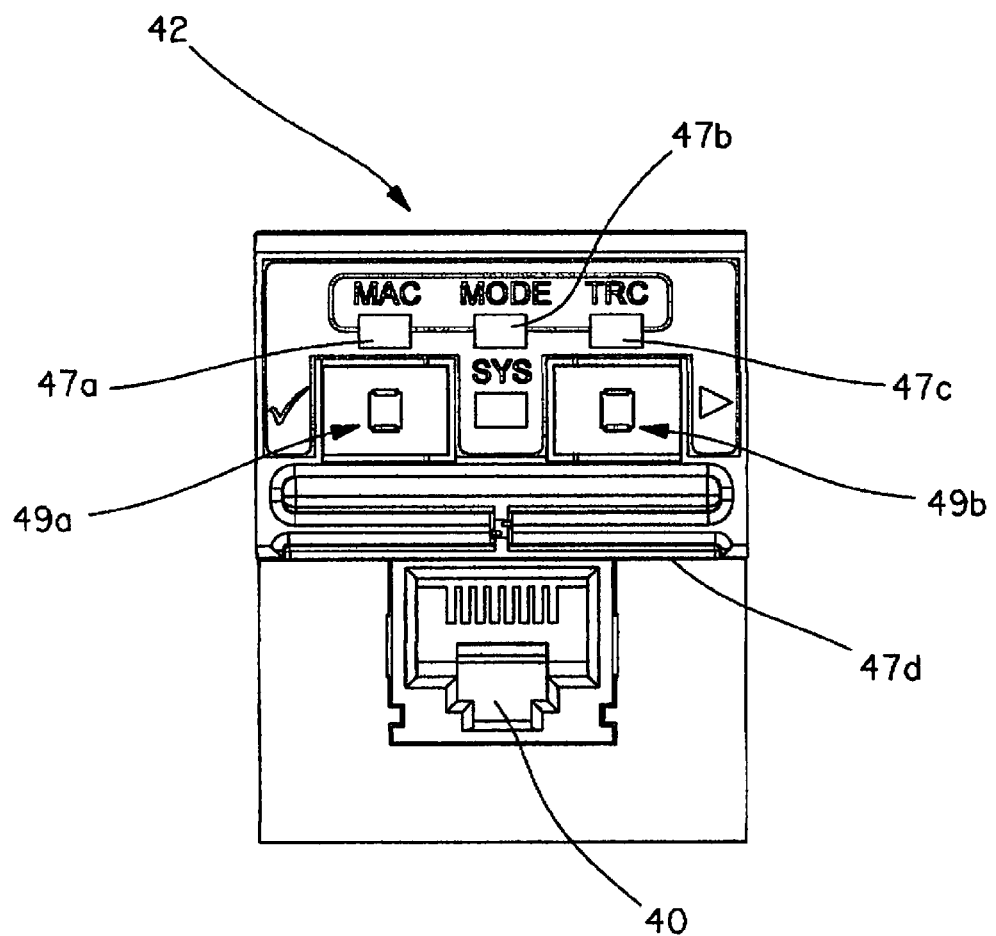
FIG. 4b is a front view of a user interface.

FIG. 4b is a front view of a user interface 42. The user interface is shown with four LED's 47a-d which are used to indicate various types of information to a technician. For example, one LED 47a may be used to indicate to a technician the location of a panel on which a proper port is located for a cord installation procedure as described further below. Other LED's may be used for various status alerts as may be designed into the system. The user interface also includes two buttons 49a and 49b, which a technician may use to interact with the user interface. For example, although many of the functions of patch panels according to the present invention are automatic, in one embodiment the first button 49a may be a "confirmation key" that a technician can press to indicate that a step has been completed. The second button 49b may be a "next key" to indicate that the technician wishes to move on to the next operation or command in certain installation or removal procedures.

These buttons may also be used in a "trace mode," in which a technician may cycle through all of the patch panel ports to confirm the connectivity of patch cords in a patch field. For example, in a cross-connect environment, this mode may be used to illuminate LED's 44 associated with both ends of each patch cord in a serial manner. In a cross-connect environment, communication between patch panels allows for the tracing of all connectivity between patch panels via signaling along ninth wires of nine-wire patch cords and communication of that connectivity to an NMS.

The provisioning port 40 is provided on the user interface 42 and is used during interconnect patch cord installation. According to one embodiment, provisioning ports 40 are provided only on patch panels having PMM's installed. Patch panels with EM's installed will have all other elements of the user interface 42, but they will not have provisioning ports 40.

Figure 5:
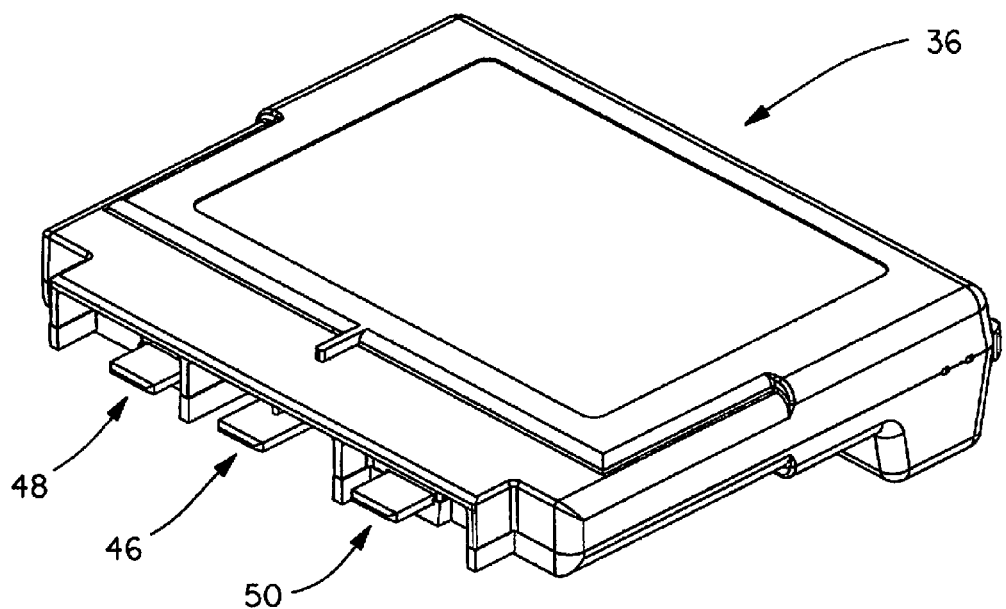
FIG. 5 is a front perspective view of a PMM.
Figure 6:
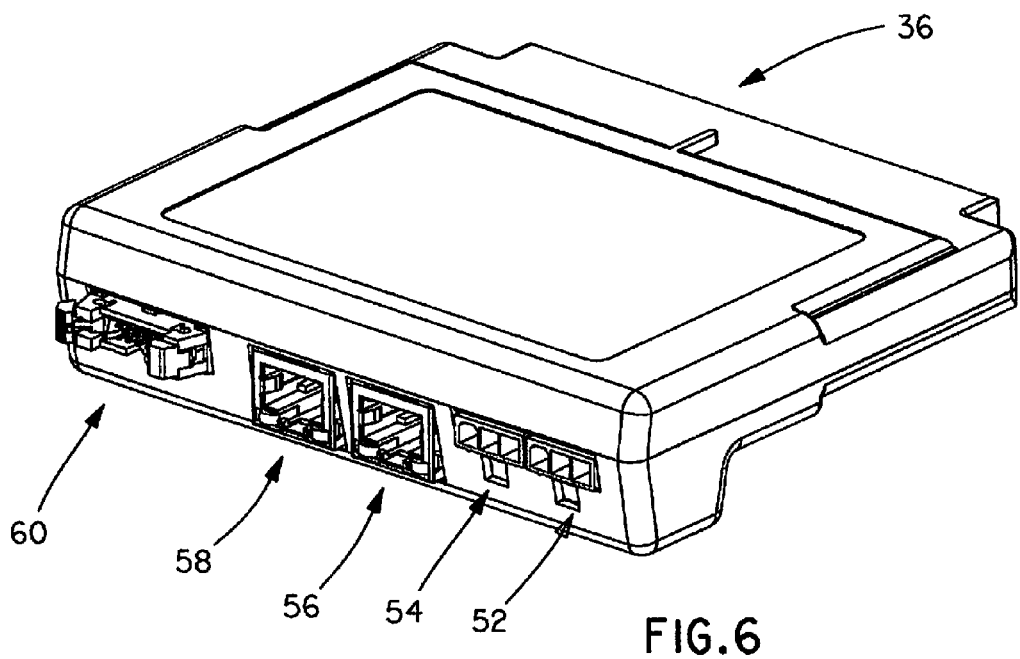
FIG. 6 is a rear perspective view of a PMM.

Turning now to FIGS. 5 and 6, front and rear views of a PMM 36 are shown. The PMM 36 preferably includes three card edge connectors 46, 48, and 50 that connect with the patch panel. The patch panel accepts the PMM in a center of the patch panel. The connector 46 mates with a user interface of the patch panel, while connectors 48 and 50 mate with left and right wing boards of the patch panel. As shown in FIG. 6, on the rear of the PMM 36 are two power ports 52 and 54, which can allow for a daisy-chain power connection. The power ports 52 and 54 may be 48-volt DC power connectors, and the PMM 36 can use either connector to receive power, with the other available to pass power to another PMM, an EM, or other module. In another embodiment, only one power port 52 is provided.

In the center of the rear of the PMM 36 are two Ethernet ports 56 and 58, which may be used for connecting to an Ethernet network and/or for daisy chaining Ethernet connectivity between PMM's or between a PMM and an EM (via a cat5e Ethernet cable, for example). The PMM also includes an additional data port 60 (such as an RS-485 port) that may be used for daisy-chaining to EM's or connecting to other expansion devices.

Figure 7:
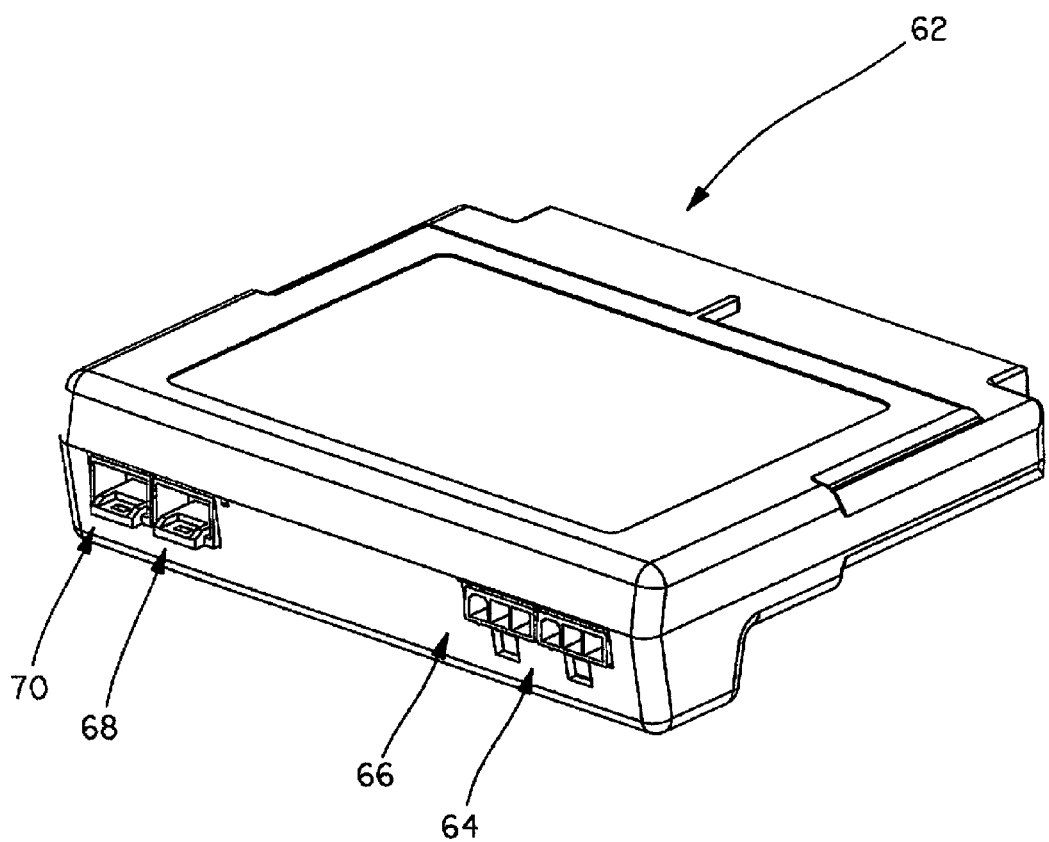
FIG. 7 is a rear perspective view of an expansion module (EM)
Figure 16:
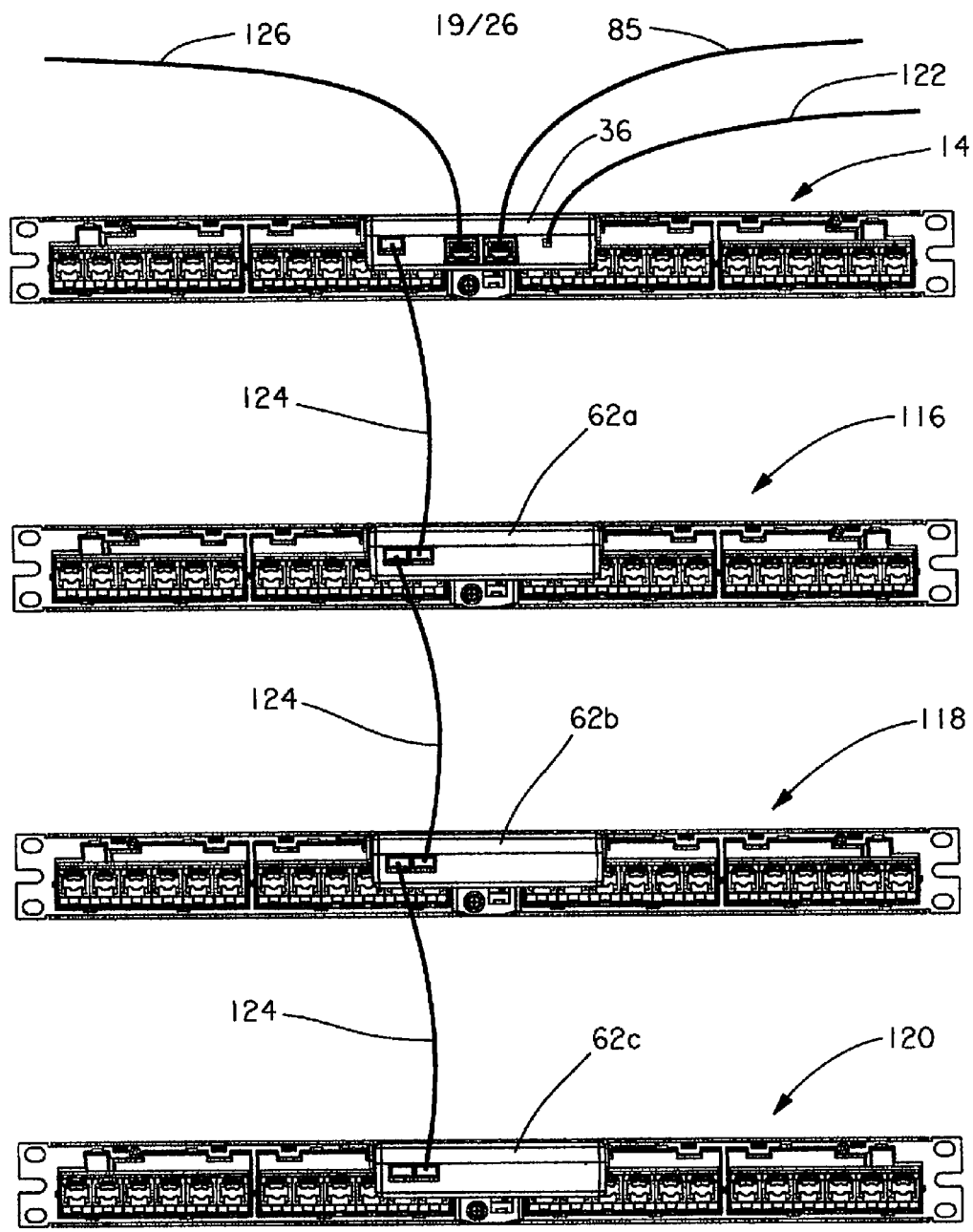
FIG. 16 is a rear view of a patch panel having a PMM that is daisy-chained to EM's.

FIG. 7 shows a rear view of an expansion module (EM) 62. The EM 62 is capable of performing some functions of the PMM, but it is electronically simpler than the PMM and therefore less expensive on a per-port basis. For example, the EM 62 does not support a provisioning port on a panel that it is installed on, and it does not support direct communication with an NMS. Rather, the EM has a data connection to the PMM, either directly or daisy-chained through other EM's. Daisy chaining of power is enabled by two power ports 64 and 66 on the EM, and daisy chaining of data connectivity is enabled by two data ports 68 and 70, such as RS-485 ports. According to one embodiment, the data ports 68 and 70 are RJ-45 jacks. Daisy chaining configurations involving EMs 62 is shown in FIGS. 11 and 16.

Figure 8:
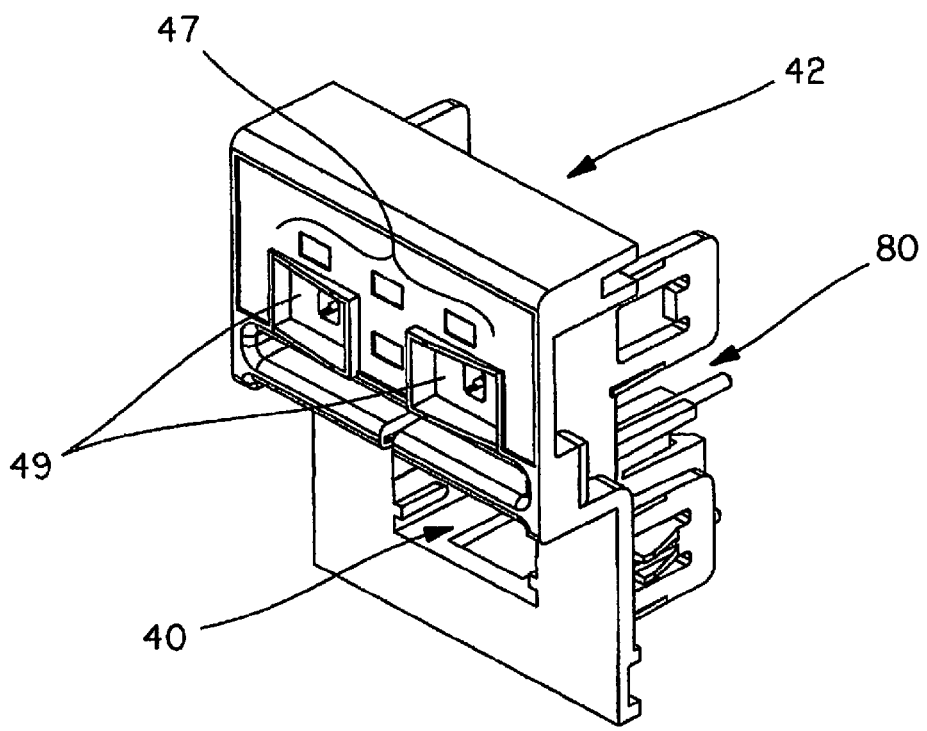
FIG. 8 is a front perspective view of a user interface.
Figure 9:
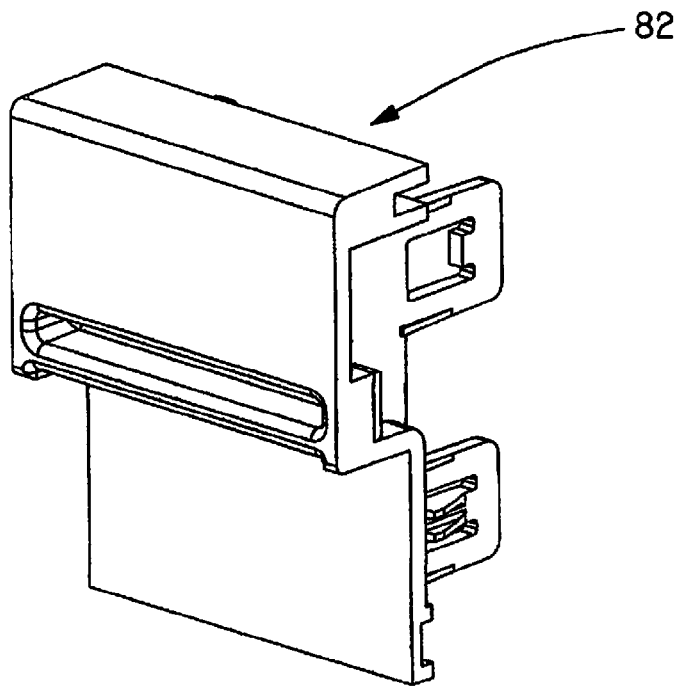
FIG. 9 is a front perspective view of a patch panel blank insert.

FIG. 8 is a perspective view of the user interface 42. A card-edge connector 80 is provided on the back of the user interface 42 to connect to a PMM. According to one embodiment of the invention, a blank insert 82, as shown in FIG. 9, may be installed on patch panels that do not allow the functionality of the user interface 42.

FIG. 10 is a front view of a wing board 38. The wing board is preferably a printed circuit board assembly that includes microcontrollers (not shown), patch panel port LED's 44, and contact pairs 84. The contact pairs 84 receive ninth-wire contacts of patch cords. Wing boards 38 may be attached to the left and right side of a patch panel. The wing boards are electrical/mechanical assemblies that provide the mechanical and electrical interfaces to patch cords as well as low-level communications hardware for data transfer between patch panels (through PMMs or EM's). The wing boards may selected from different designs, such as a power over Ethernet (PoE) wing board, a visual display wing board (such as a wing board with an LCD display), a variant wing board (such as a wingboard having environmental sensors such as temperature or moisture sensors) and/or combinations of the above.

Figure 11:
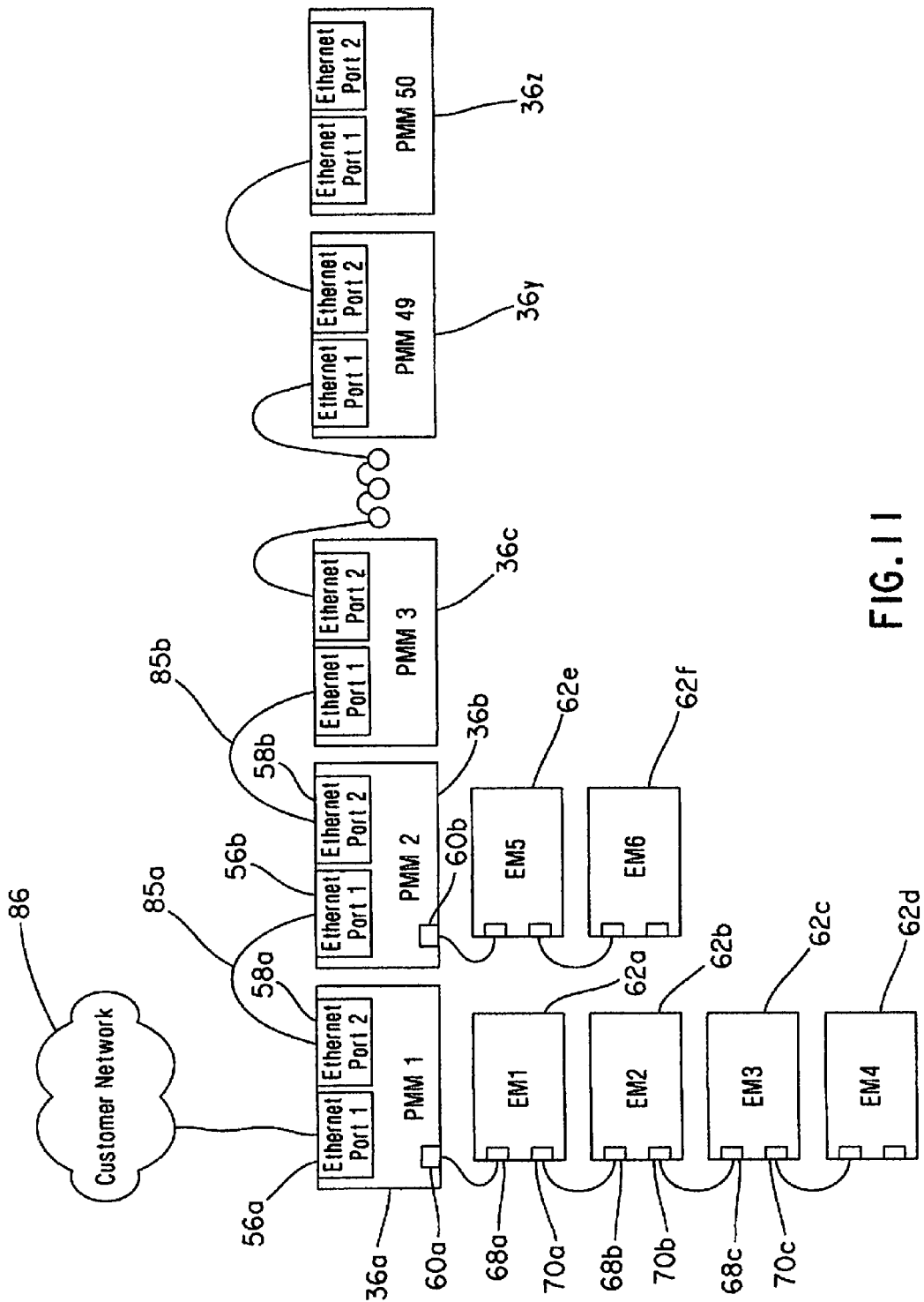
FIG. 11 is a block diagram of a configuration of PMM's and EM's.

FIG. 11 is a block diagram showing a basic architecture for a patch cord management system according to the present invention employing PMM's 36 and EM's 62. In one embodiment, Ethernet ports 56 and 58 are used to daisy-chain PMM's 36 to one another for data connectivity between PMM's. For example, PMM patching cord 85*a* connects a first PMM 36*a* to a second PMM 36*b* by using a second Ethernet port 58*a* on the first PMM and a first Ethernet port 56*b* on the second PMM. In this embodiment, the first Ethernet port 56*a* of the first PMM 36*a* is connected to the customer network 86 for network management purposes. Additional PMM patching cords, which may be standard eight-conductor Ethernet patch cords, are used to allow for additional daisy chaining of more PMM's.

The data port 60*a* of the first PMM 36*a* is used to connect the first PMM 36*a* to a first EM 62*a*, via a first EM data port 68*a*. Subsequent EM's may be similarly daisy-chained. FIG. 11 shows four EM's 62*a-d* daisy chained to the first PMM 36, and two EM's 62*e* and 62*f* daisy-chained to a second PMM 36*b*. Additional EM's may be daisy-chained to additional PMM's, but are not shown in FIG. 11. Dedicated power connections are not shown in FIG. 11, but in one embodiment the PMM's have separate power connections and power is supplied to the EM's through the daisy-chained connections between the EM's and their respective PMM's.

Figure 12:
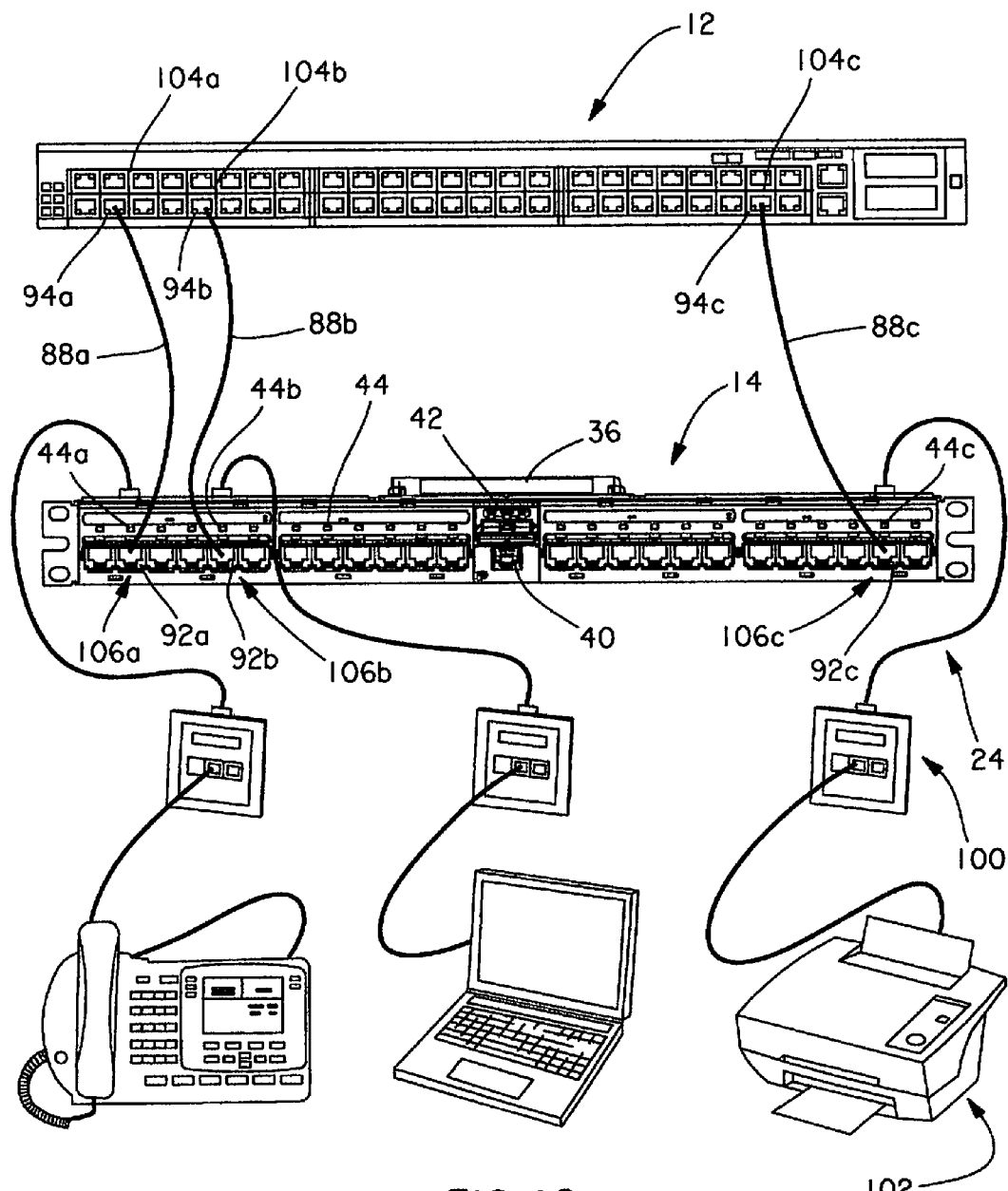
FIG. 12 is a front view of an intelligent patch panel installed in an interconnect configuration.

Different patch cords are used with the present invention depending on whether intelligent patch panels are being used in an interconnect or a cross-connect configuration. FIG. 12 shows an interconnect configuration, in which interconnect patch cords 88*a-c* are used to connect a switch 12 to an intelligent patch panel 14. As further illustrated in FIG. 13, the interconnect patch cords 88 comprise nine-wire cords 90 terminated at one end at a panel plug 92 and at the other end at a switch plug 94, which connects to a switch port 104. The panel plugs 92 have ninth-wire contacts 96 (shown in FIG. 13) that are connected to the ninth wires 98 of the interconnect patch cords 88. The ninth-wire contacts 96 are designed to fit between and complete electrical contact between the contact pairs 84 (as shown in FIGS. 10 and 13) associated with ports 106 of an intelligent patch panel 14. Horizontal cabling 24 is shown connecting the intelligent patch panel 14 to wall jacks 100, to which endpoint devices 102, such as VoIP phones, computers, or printers, are connected. The provisioning port 40 and other elements of the user interface 42 are also shown in FIG. 12. Patch panel port LEDs 44 associated with each port are also shown. FIG. 12 shows switch ports 104*a-c* connected to ports 106*a-c* with interconnect patch cords 88*a-c*.

FIGS. 12*a-d* will now be used to describe the use of indicator LEDs in the present invention to guide a technician in the installation or removal of a patch cord, including alerting the technician to problems that can occur during these processes. Throughout the present invention, LEDs are used in uniform colors and patterns to indicate particular conditions of a patch cord insertion or removal. The following guide shows general indications associated with LED colors and patterns:

Flashing Green (FG): Install plug
Solid Green (G): The plug was installed correctly
Flashing Red (FR): Remove plug
Solid Red (R): The plug was removed correctly
Flashing Amber (FA): Error—remove plug Work order software can be provided on a handheld device to control each step of a cable installation, removal, or change and to communicate instructions to the installation technician via a screen. This software can graphically illustrate the relevant LED signals for the operation as well as the location of a subject port. A work order may be received via wireless transmission to the handheld device that prompts the steps for patch cord installation or removal. The handheld device can also advise if each step is completed correctly or incorrectly.

FIGS. 12a-d show images that will be used on an installation device, such as a personal digital assistant (PDA) device, along with written descriptions of the steps illustrated. In each of FIGS. 12a-d, images of LEDs on plugs are shown to help guide a technician, although in nine-wire embodiments of the present invention, no LEDs are actually provided on the physical plugs. Text describing each step is also shown for clarity in FIGS. 12a-d.

FIG. 12a shows images that are displayed on the screen of a handheld device to guide plug installation and removal in an interconnect configuration for a "nine-wire" embodiment of the present invention.

FIG. 12b shows images that are displayed to guide plug installation and removal in a cross-connect configuration for a "nine-wire" embodiment of the present invention.

FIG. 12c shows images that are displayed in connection with problem moves, adds, or changes ("MAC's") in an interconnect configuration for a "nine-wire" embodiment of the present invention.

FIG. 12d shows images that are displayed in connection with problem MAC's in a cross-connect configuration for a "nine-wire" embodiment of the present invention.

The PDA or other handheld device can also tell the technician the type and length of a patch cord which is directed to be installed. The system can create a "Bill of Material" for patch cord requirements for each work order. The system can also determine the patch cord inventory. In addition, each type of patch cord can be color-coded, and each length of each type of patch cord could contain a barcode which is read before installation.

FIG. 13 shows how the patch cord management system of the present invention detects the insertion status of a switch plug 94 at a switch port 104. The ninth wire 98 of the interconnect patch cord 88 is connected at the panel plug 92 to a ninth-wire contact 96, which is adapted to make contact with and complete a circuit between the contacts of the contact pair 84 associated with the panel port 106. The ninth wire 98 is connected at the switch plug 94 to a plug shield 108 which is adapted to make electrical contact with a grounded jack shield 110 of the switch port 104.

When the panel plug 92 is inserted into the panel port 106, a voltage is placed on the ninth wire 98 of the interconnect patch cord 88, such that when the switch plug 94 is inserted into the switch port 104, the connection to ground will be detected by circuitry within the intelligent patch panel 14. When the switch plug 94 is removed from the switch port 104, the connection to ground is lost and this disconnection is likewise detected by circuitry within the intelligent patch panel 14.

Figure 14:
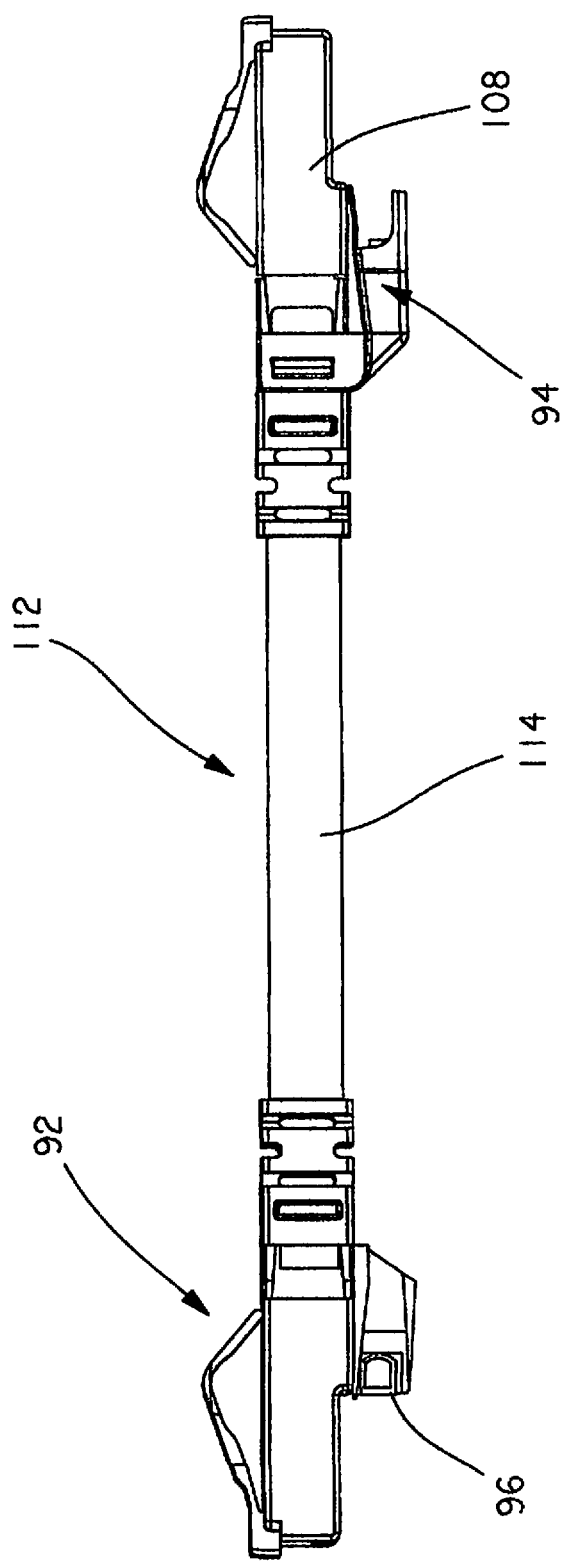
FIG. 14 is a side view of a shielded interconnect patch cord.

FIG. 14 shows a shielded eight-wire interconnect patch cord 112 for use an alternate embodiment of the present invention. Similarly to the interconnect patch cord 88 shown in FIG. 13, the shielded interconnect patch cord has a ninth-wire contact 96 provided on the unshielded panel plug 92 and a plug shield 108 provided on the switch plug 94. An internal shield 114, which is connected to the ninth-wire contact 96, is provided within the cable and serves as the ninth conductor for purposes of patch cord management.

In another alternative embodiment, a nine-wire shielded cable is utilized. In this embodiment, the ninth wire and the shield are electrically connected to a pogo switch provided in the switch plug of the cable, and also electrically connected to separate contacts in the panel plug of the cable. The switch completes a circuit between the ninth wire and the cable shield upon insertion of the switch plug into a switch port. This switch can be switched automatically upon insertion of the plug—for example a "pogo pin" style switch could be used. Using such a system, it is possible for an intelligent patch panel to detect when a switch plug has been inserted into a switch port or removed from a switch port.

Figure 15:
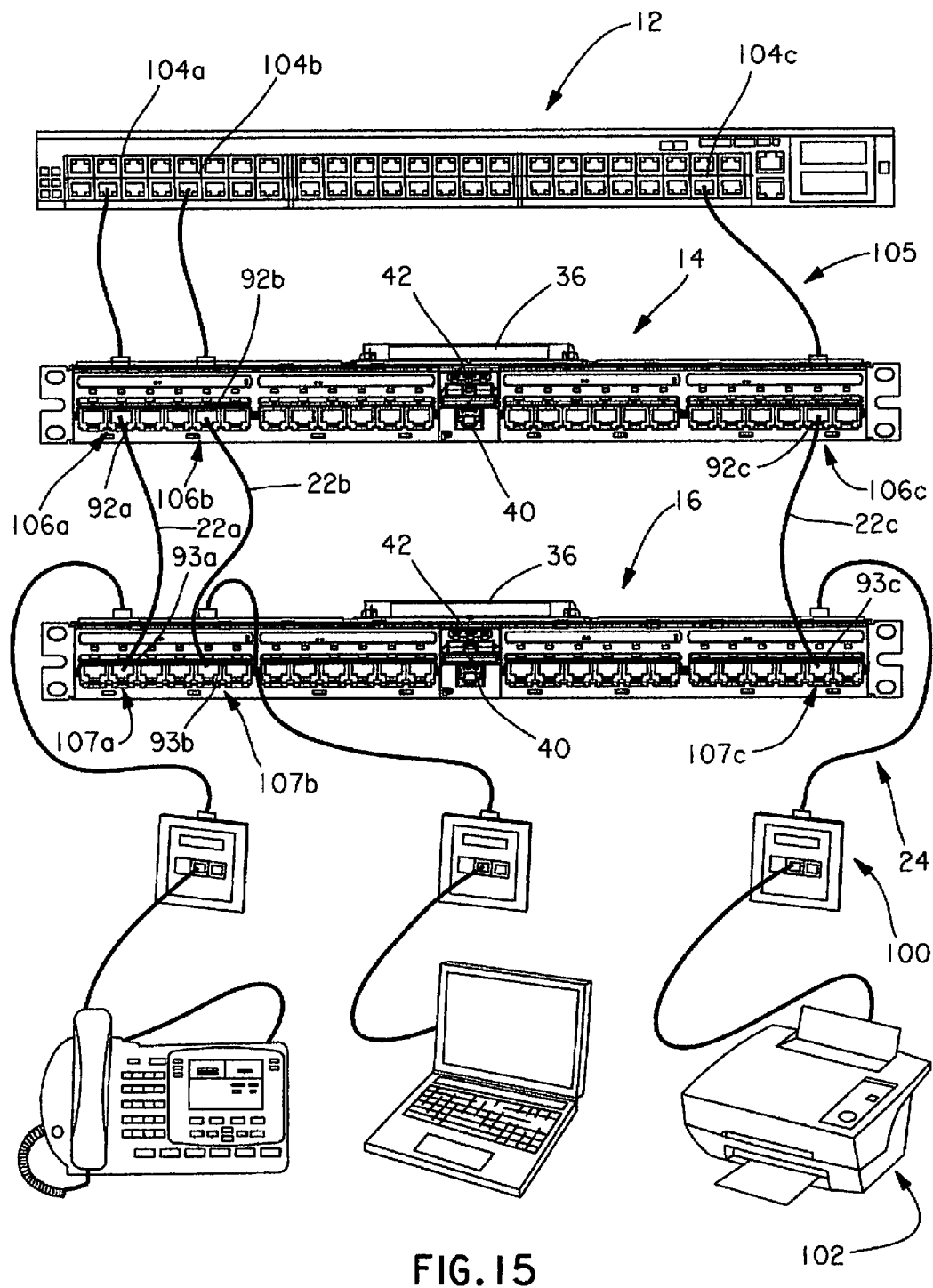
FIG. 15 is a front view of intelligent patch panels installed in a cross-connect configuration.

FIG. 15 shows two intelligent patch panels 14 and 16 according to the present invention being used in a cross-connect configuration. Cross-connect patch cords 22a-c are used to connect panel ports 106a-c on the first intelligent patch panel 14 to panel ports 107a-c on the second intelligent patch panel 16. Unlike the interconnect patch cords 88 and 112, the cross-connect patch cords 22 have ninth-wire contacts 96 (as shown, for example, in FIG. 14) on both of their plugs (i.e., first and second panel plugs 92a-c and 93a-c), as both plugs are panel plugs for insertion into intelligent patch panels. First panel plugs 92a-c are plugged into panel ports 106a-c on the first intelligent patch panel, and second panel plugs 93a-b are plugged into panel ports 107a-c on the second intelligent patch panel 16. It is to be understood that patch cords according to the present invention, though designed for use with the present invention, are capable of mating with standard RJ-45 jacks. Standard patch cords 105 connect switch ports 104a-c to rear ports on the intelligent patch panel 14.

FIG. 15 shows two intelligent patch panels with PMMs 36 installed, and thus both intelligent patch panels 14 and 16 are shown in FIG. 15 with provisioning ports 40 thereon. Alternatively, one of the patch panels may have an EM rather than a PMM installed, in which case the panel with the EM installed will not have a provisioning port. This is because in an installation with EM-based panels, the provisioning port on the PMM-based panel will fulfill the functions of the provisioning port for all panels having EM's that are connected to that PMM.

FIG. 16 is a rear view of a patch panel arrangement in which a first intelligent patch panel 14 having a PMM 36 installed is daisy-chained to three additional intelligent patch panels 116, 118, and 120 having EM's 62a-c installed. A power cable 122 supplies power to the first intelligent patch panel 14. Power and data connectivity is provided to the daisy-chained EM's 62a-c via EM daisy-chain cables 124. The PMM 36 is attached via a first RJ-45 patch cord 126 to a network switch, for example for network management purposes. The PMM may optionally be attached via a PMM patching cord 85, which may be an RJ-45 patch cord, to other PMM's which are daisy-chained for data connectivity.

In an alternate interconnect embodiment, a switch is provided with an LED adjacent to each switch port, with the switch port LED's being controlled by an intelligent patch panel system. The switch plug on a "ten-wire" patch cord may be provided with LED's to assist in installation and removal procedures, plus a light detector, such as a silicon photo detector in series with a resistor. To map the patch field, the switch port LED's flash at a particular frequency one at a time, with the signal being received by the intelligent patch panel to which the patch cord is connected. In order to determine if any switch plug is connected or disconnected, all the switch LED's flash at a particular frequency on a regular cycle. In these functions, LED's provided on the switch plugs may be cycled off during a light detection mode.

FIGS. 17a-d show LED codes that are used to guide installations and removals of patch cords, along with codes used to guide a technician through problem MAC's. These illustrations may be provided on a PDA screen or other handheld device screen as discussed above. In addition, the LED's illustrated are physically located at each patch panel port and LED's are included in each cross-connect plug and in each interconnect switch plug. Text describing each step is also shown for clarity in FIGS. 17a-d. The difference between FIGS. 17a-d and FIGS. 12a-d is that for the process shown in FIGS. 12a-d, no actual LED's are provided on patch cord plugs and thus the illuminated patch cord plug LED's are merely displayed as illuminated on a PDA screen. In the embodiment of FIGS. 17a-d, patch cord plugs are provided with LED's, and thus the LED's on the patch cord plugs are illuminated, and the LED images on the PDA are displayed as illuminated, when appropriate.

FIG. 17a shows images that are displayed on the screen of a handheld device to guide plug installation and removal in an interconnect configuration for a "ten-wire" embodiment of the present invention. The operation of LED's shown in these images correspond to the operation of LED's provided on patch cord plugs and panel ports, providing the technician with a very easy-to-follow instruction set.

FIG. 17b shows images that are displayed to guide plug installation and removal in a cross-connect configuration for a "ten-wire" embodiment of the present invention.

FIG. 17c shows images that are displayed in connection with problem moves, adds, or changes ("MAC's") in an interconnect configuration for a "ten-wire" embodiment of the present invention.

FIG. 17d shows images that are displayed in connection with problem MAC's in a cross-connect configuration for a "ten-wire" embodiment of the present invention.

FIGS. 18a-d show aspects of the user interface 42, including interface modes for use in one embodiment of the present invention. Text accompanying each of the images of the user interface 42 describes the operation of each mode. The referenced Physical Infrastructure Management (PIM) software is a software tool that allows an operator to access information about patch cord connections and to use functions of intelligent patch systems according to the present invention, including initiating work orders. Any of the illustrated and described modes can be initiated or terminated with PIM software (including access via a PDA or other handheld device with established permissions).

Intelligent patch panel systems of the present invention provide a number of functions and benefits. They can guide moves, adds, and changes of patch cords. They can provide an administrator with real-time information regarding network status and monitor connectivity of patch cords. They can map patch fields and facilitate planning, implementation, and documentation of connectivity installations and removals. Further, the systems monitor patch field changes and alert administrators of any patch field changes or potential security risks, for example by communication with an NMS. A web-based management system may be used to allow access to the functions of the systems, and to interface with third-party network management systems, help desk applications, and other enterprise systems.

What is claimed is:

1. A system for implementing an intelligent interconnect patching system comprising:
    a patch cord, the patch cord comprising at least one management conductor on a first end of the patch cord and a pogo switch and indicator light on a second end of the patch cord, the at least one management conductor being electrically coupled to a return path via the pogo switch;
    a network device; and
    a patch panel, the patch panel including at least one board with at least one patch panel port, the at least one patch panel port having at least one management conductor contact configured to electrically engage the at least one management conductor of the patch cord the patch panel further having circuitry configured to control illumination of the indicator light on the second end of the patch cord.

2. The system for implementing the intelligent interconnect patching system of claim 1 wherein the at least one management conductor includes a metallic shield.

3. The system for implementing the intelligent interconnect patching system of claim 2 wherein the at least one management conductor includes a conductor coupled to the metallic shield via the pogo switch.

4. The system for implementing the intelligent interconnect patching system of claim 3 wherein the board further comprises a user interface which allows a user to control the illumination of the indicator light on the second end of the patch cord with the circuitry on the patch panel.

* * * * *